(No Model.)  2 Sheets—Sheet 1.
C. S. SHARP.
COMBINATION HARROW.
No. 598,820.  Patented Feb. 8, 1898.
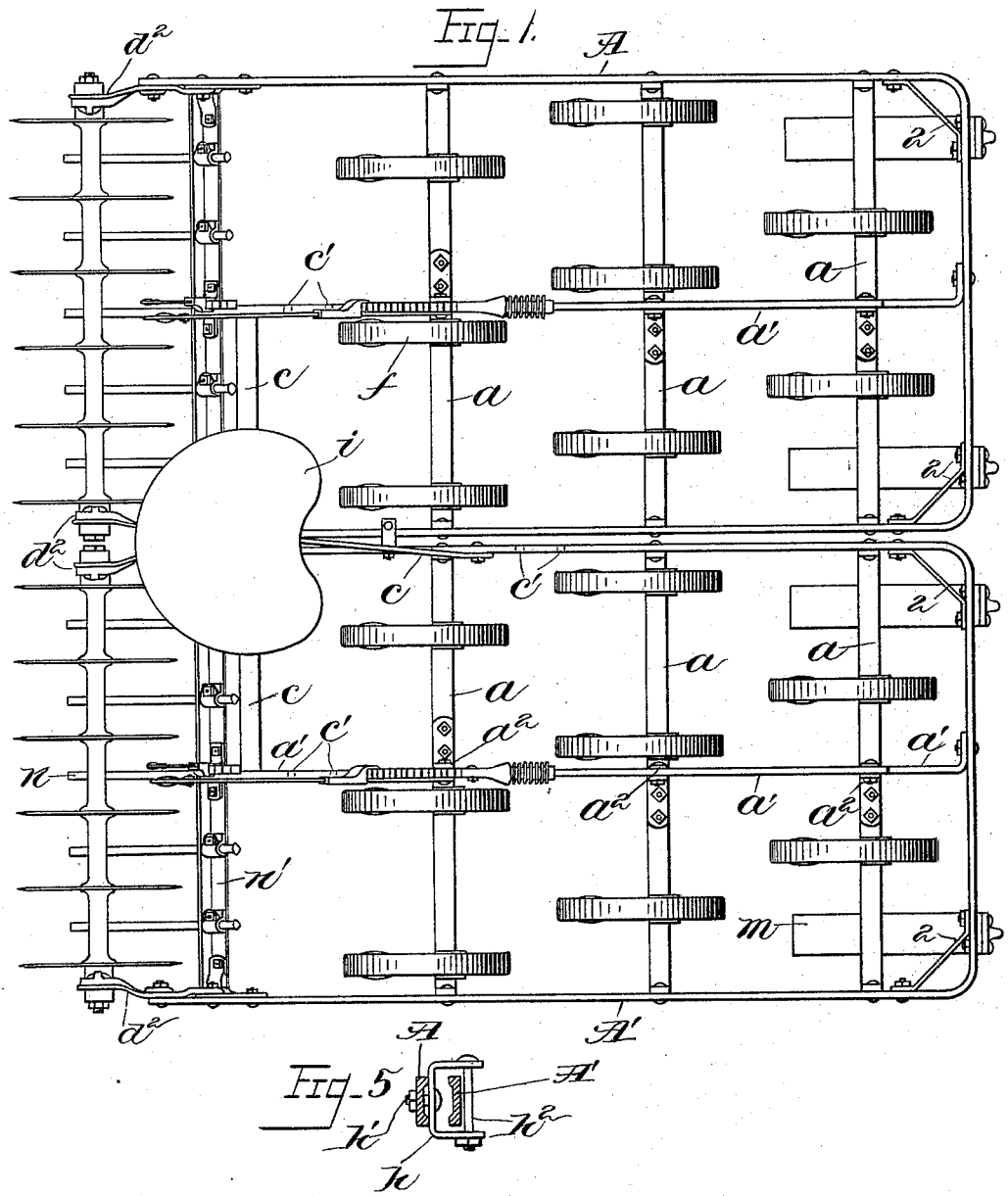
Witnesses:
May E. Foster
Arthur V. Randall
Inventor:
Charles S. Sharp
by B. J. Noyes
Attorney.

(No Model.) 2 Sheets—Sheet 2.
C. S. SHARP.
COMBINATION HARROW.
No. 598,820. Patented Feb. 8, 1898.
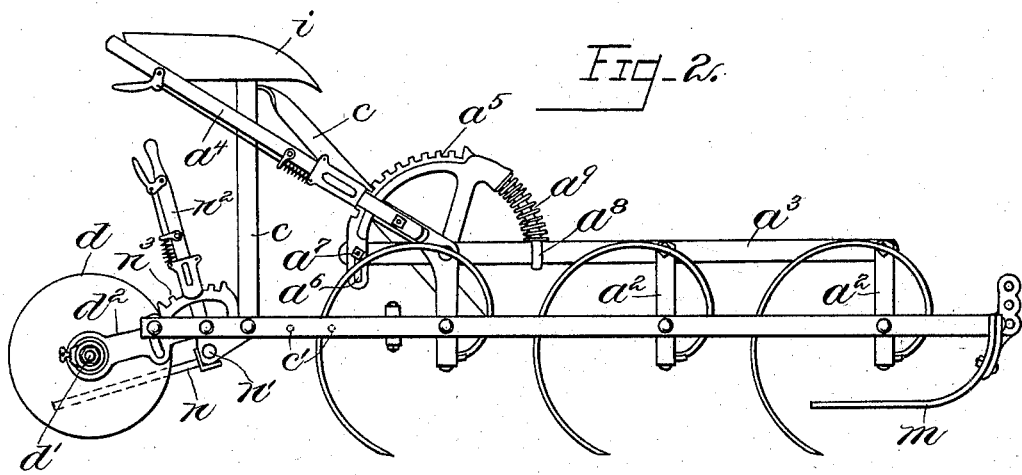
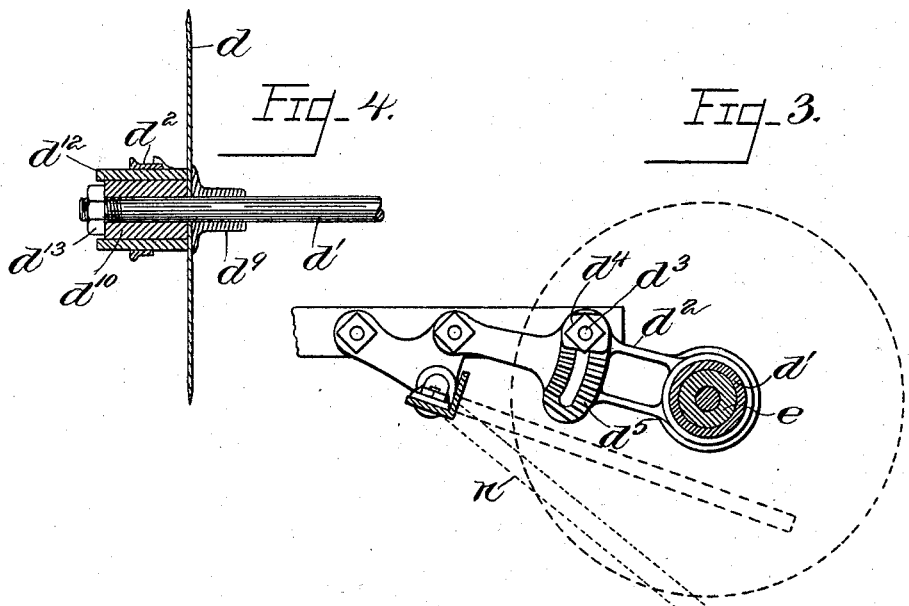
Witnesses:
Mary E. Foster
Arthur F. Randall
Inventor:
Charles S. Sharp
by B. J. Hayes,
Attorney.

UNITED STATES PATENT OFFICE.

CHARLES S. SHARP, OF AUBURN, NEW YORK, ASSIGNOR TO THE D. M. OSBORNE & COMPANY, OF SAME PLACE.

COMBINATION-HARROW.

SPECIFICATION forming part of Letters Patent No. 598,820, dated February 8, 1898.

Application filed May 29, 1897. Serial No. 638,694. (No model.)

*To all whom it may concern:*

Be it known that I, CHARLES S. SHARP, of Auburn, county of Cayuga, and State of New York, have invented an Improvement in a Combination-Harrow, of which the following description, in connection with the accompanying drawings, is a specification, like letters and numerals on the drawings representing like parts.

This invention relates to harrows, and has for its object to improve the construction of the same to the end that they shall be better adapted for working the soil, loosening the earth, cutting up clods and sod, and smoothing the field into a condition for seeding.

A harrow embodying this invention comprises, essentially, a set of spring harrow-teeth and a supporting-frame therefor, a gang of disks, and a set of spike-teeth supported at the rear of said set of spring harrow-teeth, the several spike-teeth of the set being located between the several disks of the gang. The spike-teeth decline rearwardly and project between the disks of the gang, and they are attached to a frame or bar, and means are provided for adjusting them so that their extremities will terminate in a plane with the lower edges of the disks or above or below such plane. When terminating above such plane, they not only serve as leveling-teeth for the soil, but also by reason of their location between the disks of the gang will prevent said disks from clogging, thereby obviating the necessity of providing clearers for said disks, and when terminating below such plane said spike-teeth will serve as rear supports for the harrow.

At the forward part of the harrow shoes or equivalent supports are provided, which will coöperate with said spike-teeth when in their lowermost position in supporting the harrow.

Means are provided for adjusting the set of spring harrow-teeth whereby their ends terminate in a plane with said shoes and spike-teeth or above or below said plane, the range of adjustment being sufficient to enable said teeth to occupy such relative positions, notwithstanding the different positions of the spike-teeth, and as the spring harrow-teeth are thus adjusted their position relative to the disks is correspondingly changed.

The invention also comprehends a seat and suitable supports whereby it may be supported above the junction of the two loosely-connected harrow-sections, and it also comprehends a yielding device in connection with the adjusting device for the spring harrow-teeth, whereby certain relief is afforded for the entire set of teeth.

Figure 1 shows in plan view a combination-harrow embodying this invention; Fig. 2, a side elevation of the same, and Figs. 3, 4, and 5 details to be referred to.

The harrow-frames A A', of which there are two herein shown placed side by side and loosely connected together, consist of single pieces of iron bent to present a front end portion and a pair of rearwardly-extending side bars, and said frames are braced at the bends by diagonal braces 2. Each harrow frame or section has a set of spring harrow-teeth, a set of spike-teeth, and a gang of disks, as will be described. Several cross-bars $a$, formed of flat pieces of iron with upturned ends, are pivoted to the side bars of the frame, there being three such cross-bars herein shown, and these pivoted cross-bars $a$ have attached to them spring harrow-teeth $f$, there being as many teeth employed as desired, and said teeth are disposed on and secured to the several cross-bars or shafts in any suitable manner.

A central bar $a'$ extends lengthwise the frame at a point midway between its side bars, it being attached at the forward end to the front end of the frame, and standards $a^2$ are secured to and project upwardly from the tooth-carrying bars $a$, which are pivoted to said central bar $a'$ at points midway their length. The upper ends of said standards $a^2$ are pivoted to a horizontal bar $a^3$, which lies parallel with the bar $a'$.

A set-lever $a^4$ of any usual or suitable construction is attached at its lower end to the rear tooth-carrying bar and is pivoted to the bar $a'$ and also to the bar $a^3$, and the locking-dog of said set-lever engages the teeth of a quadrant $a^5$ on the bar $a^3$.

The set-lever, quadrant, and connecting parts constitute an adjusting device for the spring harrow-teeth.

The quadrant $a^5$ is herein shown as pivoted to said bar $a^3$ and it has formed at one end a slot $a^6$, which receives a bolt or pin projecting from the bar $a^3$, and it has at its other end a loop or strap $a^8$, which embraces the bar $a^3$, thereby loosely connecting the quadrant with the bar, and a spiral spring $a^9$ encircles said loop which bears against said bar and against the quadrant and serves as a relief-spring for the quadrant, and consequently as a relief-spring for the adjusting device for the entire set of spring harrow-teeth, and such relief-spring tends to dissipate any violent strain upon said spring harrow-teeth and their adjusting devices. The set-lever $a^4$ may operate to rock the tooth-carrying bars $a$ in such manner that the teeth may terminate at different levels or elevations.

At the rear end of the frame or section $a$ gang of disks $d$ are provided, they being mounted upon a shaft $d'$, supported by a pair of rearwardly-extending arms $d^2$, bolted to the rear ends of the side bars of the frame and held in adjusted positions by a bolt $d^3$, a clamping-plate $d^4$, which engages a serrated portion $d^5$ of said arms. As herein shown, the disks are placed upon the shaft $d'$ and separated by spools $d^9$, and upon the ends of said shaft $d'$ collars $d^{10}$ are placed which receive upon them bushings $d^{12}$, which are placed in and supported by the rearwardly-projecting arms $d^2$. The ends of the shaft $d'$ are threaded to receive upon them nuts $d^{13}$, by means of which the assembled parts may be securely held together. By loosening the nuts on the bolts $d^3$ the gang of disks may be adjusted to different elevations. Also at the rear end of the harrow frame or section a set of spike-teeth $n$ are provided, they being securely fastened to a cross-bar $n'$, having its bearings in a plate, or it may be an ear, at the extremities of the side bars of the harrow-frame, said shaft rocking in its bearings to support the spike-teeth $n$ in different elevations.

The spike-teeth $n$ project rearwardly and decline, as shown in dotted lines, Fig. 2, and the several spike-teeth of the set occupy positions between the several disks of the gang and project rearwardly beyond the centers of said disks, so that by reason of their location they serve as a means of preventing the disks from clogging, and thereby avoiding the necessity of providing clearers for the disks. The spike-teeth also operate in conjunction with the spring harrow-teeth and disks in breaking up and leveling the soil, substantially in the same manner as ordinary spike-teeth. The shaft $n'$, to which the spike-teeth $n$ are secured, has fixed to it a set-lever $n^2$ of any usual construction, the dog of which is adapted to engage the teeth of a quadrant $n^3$, secured to the rear end of the central bar of the harrow-frame, and by adjusting said set-lever $n^2$ to different positions the rearwardly-declining spike-teeth $n$ may be caused to occupy different positions relative to the disks $d$, and the range of adjustment is sufficient for said spike-teeth to terminate in a plane with the lower edges of the disks $d$ or above or below said plane, and when adjusted to occupy a position below said plane they will serve as rear supports for the harrow and may be used like shoes in dragging the harrow over the field.

Shoes $m$ are secured to the front end of the harrow-frame, which operate in conjunction with spike-teeth $n$, when the latter are in their lowermost position, to support the harrow, it being necessary that at such time the set-lever $a^4$ be adjusted so that the spring harrow-teeth will terminate above the plane of said shoes or harrow-supports.

With the parts as shown in Fig. 2 the spring harrow-teeth are adapted to enter the soil and also the disks $d$, and the shoes $m$ and spike-teeth tend to limit to a certain extent the depth that said teeth and disks shall enter the soil, and by adjusting the spike-teeth $n$ the depth that the teeth and disks shall enter the soil may be varied, and, furthermore, it will be understood that said teeth $n$, by reason of their construction, coöperate with the other teeth in leveling and smoothing the soil. If desired, the disks $d$ may be adjusted to an elevated position and the spike-teeth $n$ depressed, so that only the spring harrow-teeth and spike-teeth will be used, the disks being out of operative position. Even in such case the range of adjustment of the spring harrow-teeth is sufficient to still adjust said teeth so that their points may terminate in a plane with the shoes and spike-teeth or above or below said plane. Therefore it will be seen that the combination-harrow herein shown possesses many combinations of features to adapt the implement for a variety of uses.

The two harrow-frames A A' are connected together loosely by a coupling such as shown in Fig. 5, wherein it will be seen that $h$ represents a bracket which is bolted to the frame A by a bolt $h'$, and the ends of said bracket $h$ embrace the side bar of the frame A', and a bolt $h^2$ connects the extremities of said bracket, thereby inclosing said side bar; but so far as my invention is concerned said harrow-frames may be loosely connected in any other desirable way.

A seat $i$ is mounted upon and supported by three braces or diagonal supports $c$, two of which are bolted at their lower ends to the middle bars of the harrow-frames and the third being bolted at its lower end to one of the side bars of one of the harrow-frames, thereby supporting said seat directly above the junction of the two harrow-frames, and the bars to which said diagonal supports $c$ are bolted each have several holes to receive the bolts in order that said seat may be supported at different distances from the front end of the harrow to change the balance of the harrow by changing the position of the weight of the rider.

I claim—

1. In a harrow, a set of spring harrow-teeth and a supporting-frame therefor, a gang of disks and a set of spike-teeth supported by said frame at the rear of said spring harrow-teeth, the several spike-teeth of the set being located between the several disks of the gang, substantially as described.

2. In a harrow, a set of spring harrow-teeth and a supporting-frame therefor, a gang of disks and the set of spike-teeth supported at the rear of said spring harrow-teeth, the several spike-teeth of the set declining rearwardly and located between the several disks of the gang, and extending rearwardly beyond the centers of said disks, substantially as described.

3. In a harrow, the combination of a frame, shoes at the front end thereof, and a set of rearwardly-declining spike-teeth at the rear end thereof, a set of spring harrow-teeth supported by said frame, and means for adjusting said spring harrow-teeth whereby their ends terminate in a plane with said shoes and spike-teeth, or above or below said plane, and a gang of disks supported by and at the rear end of said frame, the disks of which occupy positions between the aforesaid spike-teeth, substantially as described.

4. In a harrow, a set of spring harrow-teeth and a supporting-frame therefor, and means for adjusting simultaneously said spring harrow-teeth to different elevations, a gang of disks and a set of spike-teeth supported at the rear of said spring harrow-teeth, and means for adjusting simultaneously said spike-teeth to different elevations, substantially as described.

5. In a harrow, a set of spring harrow-teeth and a supporting-frame therefor, and means for adjusting simultaneously said spring harrow-teeth to different elevations, a gang of disks supported at the rear of said spring harrow-teeth, shoes at the forward part of the harrow, and a set of rearwardly-declining spike-teeth at the rear part thereof, and means for adjusting said spike-teeth, whereby their ends terminate in a plane with the lower edge of said disks or above or below said plane, substantially as described.

In testimony whereof I have signed my name to this specification in the presence of two subscribing witnesses.

CHARLES S. SHARP.

Witnesses:
 RAYMOND M. ATHERLY,
 FREDERICK M. EVERITT.